United States Patent

Ferrara

[15] 3,666,898

[45] May 30, 1972

[54] QUIET LISTEN/TALK ADAPTORS FOR HANDSETS OR OTHER TYPICAL PHONES

[72] Inventor: Peter B. Ferrara, Bel Air, Md.

[73] Assignee: The United States of America as represented by the Secretary of the Army

[22] Filed: Dec. 10, 1970

[21] Appl. No.: 96,797

[52] U.S. Cl. ..........................................179/180, 179/182 R

[51] Int. Cl...........................................................H04r 1/10

[58] Field of Search..................179/180, 182, 183, 188, 187, 179/179, 178, 156, 103

*Primary Examiner*—Kathleen H. Claffy

*Assistant Examiner*—Thomas W. Brown

*Attorney*—Harry M. Saragovitz, Edward J. Kelly and Herbert Bell

[57] ABSTRACT

A sound attenuating adaptor for detachable connection to the receiver of a telephone handset consisting of a cap of resilient sound absorbing material which slips over the receiver of the handset. The cap is provided with a valve which, when the adaptor is pressed to a user's ear, deforms, causing the valve to open and permit the user to hear sound emitted from the receiver. The valve per se may be a slit in the outer end of the cap or a disc embedded therein, which slides on a tube when the cap is deformed to expose holes and allow escape of sound.

5 Claims, 6 Drawing Figures

Patented May 30, 1972 3,666,898

INVENTOR,
Peter B. Ferrara

BY: Harry M. Saragovitz, Edward J. Kelly & Herbert Berl
ATTORNEYS.

QUIET LISTEN/TALK ADAPTORS FOR HANDSETS OR OTHER TYPICAL PHONES

The invention described herein may be manufactured, used, and licensed by or for the Government for governmental purposes without the payment to me of any royalty thereon.

The present invention relates to a sound attenuator for use with a telephone receiver whereby the sounds emitted from the receiver cannot be heard until the attenuator is pressed to the ear of the user.

Many devices have been in existence to be attached to the mouthpiece of a telephone for enabling one to talk into the mouthpiece without being heard by others, but there has been no reliable sound attenuator for attachment to the earpiece of the phone. Such a device is desirous in modern warfare to prevent the enemy from hearing sounds emitted from the receiver of a phone which, in the case of radio phones produce raucous, high pitched static noises. Such noises could easily cause detection of the position of troops by the enemy.

The present invention proposes to suppress these noises, even eliminate them, by use of a cap like member of resilient sound damping material to be slipped over the receiver cap of a telephone. In order to hear any transmission, the user must press the member to the ear, which action opens a valve to permit escape of the sound emitting from the receiver. When used on a one piece telephone handset having also a voice attenuator on the mouthpiece, a highly silent phone instrument is produced and which can be used in places such as a jungle where any noise could be detected by the enemy and the user's location be spotted.

It is therefore a principal object of this invention to provide an attenuator to be attached to the earpiece of a telephone receiver.

It is another object to provide a device for preventing sounds emitted from a telephone's receiver from being heard until the device is pressed to the ear of a user, then only by the user.

A further object is to provide a noise attenuator for a telephone receiver having a valve which is opened by deformation of the device to permit hearing of the sounds emitted therefrom.

A final object is to provide a sound attenuator for a telephone receiver that is simple and economical of construction.

These and other objects and advantages of the present invention will be apparent from the following description when taken in connection with the annexed drawing in which.

Figures 1, 2, 3, 4, 5, 6:
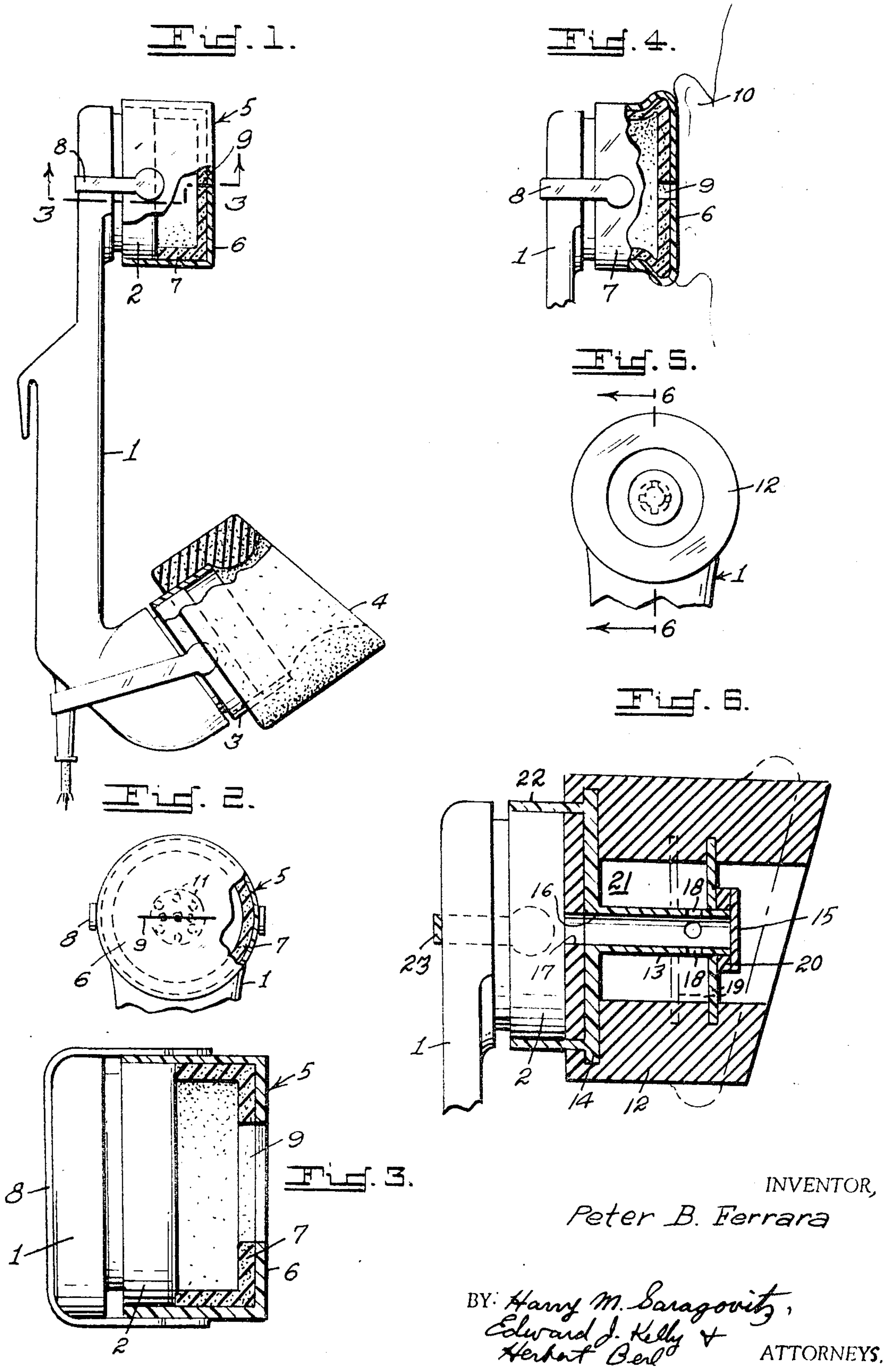
FIG. 1 is a side elevation, partly in section, of a telephone handset with the adaptor of this invention applied to the receiver.
FIG. 2 is a front view of the adaptor, partly in section, and on a smaller scale.
FIG. 3 is a sectional view taken along line 3—3 of FIG. 1 and drawn to a larger scale of the adaptor of FIG. 1.
FIG. 4 is a view, on a smaller scale, showing the adaptor being deformed by pressing it against the ear to open the valve.
FIG. 5 is a front view of a modified form adaptor and valve.
FIG. 6 is a sectional view, on a larger scale, taken along line 6—6 of FIG. 5, the valve being shown in open position by broken lines.

Referring in detail to the drawing wherein like reference numerals denote like parts throughout the several views, reference character 1 indicates a one piece telephone handset having a receiver 2 and a mouthpiece 3.

A voice attenuating adaptor 4 is shown attached to mouthpiece 3 and forms no part of this invention since it may be any of the attenuators now on the market and is merely used in conjunction with the attenuating adaptor of this invention to provide a completely silent instrument.

The attenuating adaptor of this invention is designated generally by 5 and comprises a sound suppressing cup of resilient sound absorbing material 7, such as foam rubber. An annular liner 6 of a plastic like material fits over cup 6, its skirt extending beyond cup 6 to provide means for slipping the assembly over receiver 2 as best seen in FIG. 3. A loop 8 of the same material as liner 7 and fixed thereon provides means for securing adaptor 5 to the handset 1, as shown. A valve is provided in adaptor 5 and consists of a horizontally disposed slit 9 cut through the material 7 and liner 6, best seen in FIGS. 2 and 3.

The operation of the adaptor 5 is depicted in FIG. 4. The receiver 2 and attached adaptor 5 is pressed against the ear 10 of the user. This causes the adaptor 5 to deform and slightly open slit 9 which permits sound emitted through holes 11 (see FIG. 2) of receiver 2 to be heard by the ear 10 of the user. The sounds are damped by the cup shaped member 7 so that they cannot be heard by anyone else but the user.

When the attenuating adaptor 5 is used in conjunction with a voice attenuating adaptor 4 a completely silent phone instrument is provided and can be safely used where it is desired to prevent escaping noises to be heard by an enemy or by unauthorized personnel.

In FIGS. 5 and 6 there is shown a modified attenuating adaptor. This consists of a ring 12 of a resilient material such as foam rubber and is provided with a modified valve consisting of a tube 13 which is attached to a base disc 14 molded in the foam rubber as shown. Tube 13 is closed at its forward end by disc 15. Tube 13 communicates with central openings 16 and 17 in disc 14 and foam rubber 12, respectively. Openings 16, 17 and tube 13 are in axial alignment with receiver holes 11, not shown in FIG. 6 to provide passage of sound from the receiver 2. Radial openings 18 are provided in the forward portion of tube 13. A disc 19 is molded in foam rubber 12 and this disc is separated by a ring 20 from disc 15 and normally is pressed against it by spring action of foam rubber 12 so that when the valve is closed, no sound can escape from the area 21 between disc 19 and base disc 14.

When the attenuating adaptor is pressed to ear 10 of the user in the manner shown in FIG. 4, disc 19 will be moved rearwardly as shown by broken lines in FIG. 6 to allow sound to escape through openings 18 to ear 10.

A cap 22 is formed on the rearward end of disc 14 for slipping over receiver 2 and a loop 23 is provided to hold the attenuator to the receiver 2. Discs 15, 19 and 14 and cap 22 may be molded from plastic like material if desired for purposes of economy and being impervious to damp weather, etc. Tube 13, disc 14 and cap 22 may be molded in one piece if desired.

It is apparent that a reliable, efficient and simple sound suppressor has been devised and which possesses long lasting life and is quickly mounted on or demounted from a telephone receiver for use in many stations where it is desired to hold a telephonic conversation without detection from others.

What is claimed is:

1. A sound attenuating adaptor for use with a telephone receiver comprising a deformable, resilient cap of sound suppressing material detachably mountable on said receiver and a valve carried by said cap, said valve being held closed by spring action of said material, said valve opening upon deformation of said cap when pressed to the ear of a user to enable said user to hear sound emitted from said receiver.

2. A sound attenuating adaptor as claimed in claim 1 wherein said valve comprises a horizontally disposed slit in the forward end of said cap.

3. A sound attenuating adaptor as claimed in claim 1 wherein said sound deformable material is foam rubber.

4. A sound attenuating adaptor as claimed in claim 1 wherein said valve comprises an axially disposed tube mounted in said cap, said tube being closed at its forward end and adapted for communication with said receiver at its other end, there being at least one opening in the forward portion of said tube and a disc embedded in said sound suppressing material of said cap and slidable on said tube, said disc being retained by spring action of said material forwardly of said opening whereby said valve is closed to suppress sound emitted from said receiver and to be moved rearwardly of said opening when said attenuator is pressed to the ear of a user to permit sound to be heard by said user.

5. In combination with a telephone handset including a mouthpiece, a voice suppressor on said mouthpiece and an earpiece; a sound attenuating adaptor comprising a cap of deformable material, a loop secured to said cap for detachably mounting said adaptor over said earpiece and a valve carried by said cap, said valve being normally held in closed position by spring action of said material to prevent exit of sound emitted by said earpiece and to be opened to permit exit of said sound when said adaptor is pressed to the ear of a user to enable hearing of said sound.

* * * * *